(12) United States Patent
Yang et al.

(10) Patent No.: US 11,296,963 B1
(45) Date of Patent: Apr. 5, 2022

(54) SYSTEM AND METHOD OF TRAFFIC PREDICTION FOR IOT NODES

(71) Applicant: Beijing University of Posts and Telecommunications, Beijing (CN)

(72) Inventors: Hui Yang, Beijing (CN); Lin Guan, Beijing (CN); Qiuyan Yao, Beijing (CN); Bowen Bao, Beijing (CN); Chao Li, Beijing (CN); Zhengjie Sun, Beijing (CN); Jie Zhang, Beijing (CN)

(73) Assignee: Beijing University of Posts and Telecommunications, Beijing (CN)

(*) Notice: Subject to any disclaimer, the term of this patent is extended or adjusted under 35 U.S.C. 154(b) by 16 days.

(21) Appl. No.: 17/114,772

(22) Filed: Dec. 8, 2020

(30) Foreign Application Priority Data

Nov. 9, 2020 (CN) .......................... 202011241259.7

(51) Int. Cl.
*H04L 43/062* (2022.01)
*H04L 43/067* (2022.01)
*G06K 9/62* (2022.01)
*H04L 43/16* (2022.01)
*H04L 43/0882* (2022.01)

(52) U.S. Cl.
CPC .......... *H04L 43/062* (2013.01); *G06K 9/6257* (2013.01); *H04L 43/067* (2013.01); *H04L 43/0882* (2013.01); *H04L 43/16* (2013.01)

(58) Field of Classification Search
CPC . H04L 43/062; H04L 43/067; H04L 43/0882; H04L 43/16; G06K 9/6257; H04W 16/00; H04W 16/14; H04W 16/18; H04W 24/08; H04W 28/02; H04W 72/08; H04W 72/085; H04W 88/08
See application file for complete search history.

(56) References Cited

U.S. PATENT DOCUMENTS

| | | | |
|---|---|---|---|
| 2018/0212827 A1* | 7/2018 | Eryigit | H04L 41/0823 |
| 2019/0045370 A1* | 2/2019 | Al-Fanek | H04W 16/14 |
| 2019/0364492 A1* | 11/2019 | Azizi | H04W 68/005 |
| 2021/0250245 A1* | 8/2021 | Li | H04W 24/04 |
| 2021/0345134 A1* | 11/2021 | Ottersten | G06N 5/04 |
| 2021/0377960 A1* | 12/2021 | Carl | H04W 28/08 |
| 2021/0409976 A1* | 12/2021 | Ergen | H04W 24/08 |
| 2021/0410043 A1* | 12/2021 | Khoury | H04W 4/33 |
| 2022/0038375 A1* | 2/2022 | Bielby | H04L 67/12 |

\* cited by examiner

*Primary Examiner* — Joseph L Greene
(74) *Attorney, Agent, or Firm* — Westbridge IP LLC

(57) ABSTRACT

A system of traffic prediction for IoT nodes includes at least one access node, a transmission network and a cloud platform. The access node is configured to collect traffic data, cluster the traffic data into access traffic data and network traffic data, input the access traffic data into an access traffic prediction model to obtain a prediction result of the access traffic at a next moment, and upload the network traffic data and the prediction result of the access traffic to the cloud platform; the cloud platform is configured to input the network traffic data into a network traffic prediction model to obtain a prediction result of the network traffic for each access node at the next moment, and obtain a prediction result of traffic for each node according to the prediction result of the network traffic and the prediction result of the access traffic.

20 Claims, 4 Drawing Sheets

SYSTEM AND METHOD OF TRAFFIC PREDICTION FOR IOT NODES

CROSS-REFERENCE TO RELATED APPLICATIONS

The present application claims priority of Chinese patent application CN202011241259.7 filed on Nov. 9, 2020, the entire contents of which are incorporated herein by reference.

TECHNICAL FIELD

One or more examples of the present disclosure relate to a technical field of network control, more particularly, to a system and a method of traffic prediction for Internet of Things (IoT) nodes.

BACKGROUND

Developments of applications and technologies of IoT have brought about a large number of novel man-machine interactions. Terminals to be monitored and interacted with can be connected through access nodes in the IoT. However, various kinds of traffic can be generated by these terminals, which bring great challenges to the access nodes.

In this scenario, it is desirable that the traffic at the access nodes can be predicted in real-time so as to detect any abnormal traffic tide as early as possible. Further, based on a traffic prediction result, network resources can be planned in advance. That is, routing, modulation strategies and allocation of frequency spectrum can be adjusted in real-time. Therefore, stability and reliability of the IoT system can be ensured. As a result, network resources can be balanced and vigilance against risks can also be improved.

For these purposes, researchers have developed various traffic prediction techniques to allocate network resources reasonably and also provide a basis for real-time network control.

SUMMARY

In light of this, one or more examples of the present disclosure provide a system of traffic prediction for IoT nodes, which includes: at least one access node, a transmission network and a cloud platform.

The at least one access node is to collect traffic data, cluster the traffic data according to path information in the traffic data to obtain access traffic data and network traffic data, input the access traffic data into an access traffic prediction model configured, output a prediction result of the access traffic at a next moment, and upload the network traffic data and the prediction result of the access traffic at the next moment to the cloud platform through the transmission network.

The cloud platform is to input the network traffic data uploaded by the at least one access node into a network traffic prediction model configured, output a prediction result of the network traffic for each access node at a next moment, and obtain a prediction result of traffic for each node according to the prediction result of the network traffic at the next moment for each access node and the prediction result of the access traffic at the next moment received from each access node.

According to the system of traffic prediction for IoT nodes, one or more examples of the present disclosure provide a method of traffic prediction for IoT nodes. The method may include: collecting, by each access node, traffic data; clustering, by each access node, the traffic data into access traffic data and network traffic data according to path information in the traffic data; inputting, by each access node, the access traffic data into an access traffic prediction model configured, to obtain a prediction result of the access traffic at a next moment output by the traffic prediction model; uploading, by each access node, the prediction result of access traffic at the next moment and the network traffic to a cloud platform; receiving, by the cloud platform, the network traffic data and the prediction result of access traffic at the next moment reported by each access node; inputting, by the cloud platform, the network traffic data into a network traffic prediction model configured, to obtain a prediction result of the network traffic for each access node at the next moment output by the network traffic prediction model; and determining and outputting, by the cloud platform, a prediction result of traffic at the next moment for each access node according to the prediction result of access traffic at the next moment for each access node and the prediction result of network traffic at the next moment.

As can be seen, the system and method of traffic prediction for IoT nodes can predict a relatively long-term network traffic trend by utilizing the cloud platform. The system and method of traffic prediction for IoT nodes can predict a relatively short-term access traffic change by utilizing the access nodes. Further, by combining the relatively long-term network traffic trend and the relatively short-term access traffic change, one-sidedness and limitation caused by a single position of a prediction module in a network and a single time granularity configuration can be avoided, thus, accuracy of traffic prediction for the system can be greatly improved.

Furthermore, the access traffic prediction model and the network traffic prediction model have good cycle stability, with no significant change in performance after a plurality of tests and experiments.

BRIEF DESCRIPTION OF DRAWINGS

In order to explain one or more examples of the present disclosure more clearly, accompanying drawings illustrating examples of the present disclosure are briefly introduced. Obviously, the accompanying drawings are only one or more examples of the present disclosure. Those of ordinary skill in the art may further obtain other accompanying drawings based on these accompanying drawings without paying any creative work.

DETAILED DESCRIPTION OF THE EMBODIMENTS

In order to make the objectives, technical solutions, and advantages of the present disclosure clearer, the present disclosure will be further described in detail with reference to specific examples described below together with the accompanying drawings.

It should be noted that, unless otherwise defined, the technical terms or scientific terms used in one or more examples of the present disclosure should have the ordinary meanings understood by persons with ordinary skills in the field of the present disclosure. The terms "first", "second" and the like used in one or more examples of the present disclosure do not indicate any order, quantity or importance, but are only used for distinguishing different constituent components. The terms "comprising" or "containing" and the like mean that the element or object appearing in front of the term covers the elements or objects and their equivalents listed after the term, without excluding other elements or objects. The terms such as "connection" or "connected" and the like are not limited to physical or mechanical connections, but may comprise electrical connections, regardless of direct connection or indirect connection. The terms "up", "down", "left", "right" and the like are only used for indicating the relative position relationship. When the absolute position of the described object changes, the relative position relationship may also change accordingly.

Figure 1:
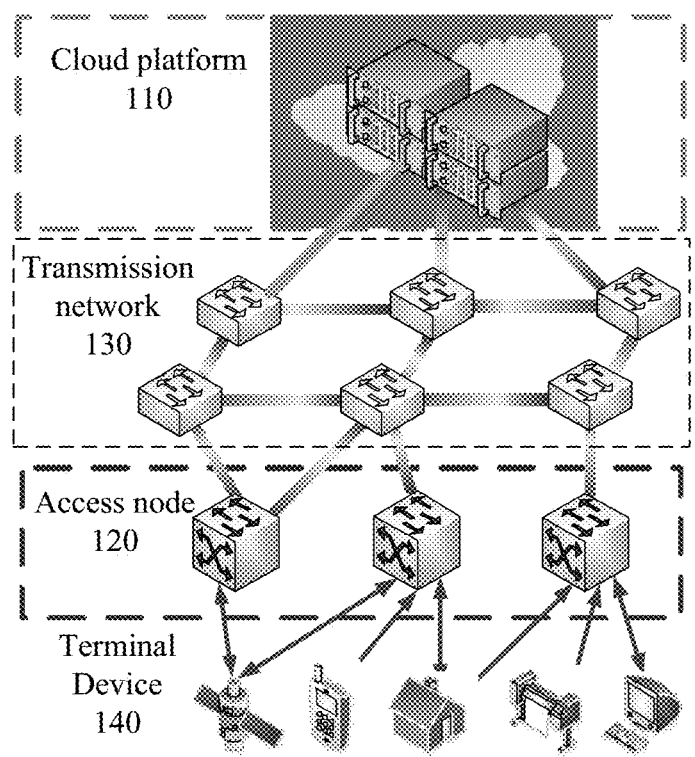
FIG. 1 is a schematic diagram of an internal structure of a system of traffic prediction for IoT nodes according to some examples of the present disclosure.

One or more examples of the present disclosure provide a system of traffic prediction for IoT nodes. FIG. 1 shows an internal structure of a system 100 of traffic prediction for IoT nodes according to some examples of the present disclosure.

As shown in FIG. 1, the system 100 of traffic prediction for IoT nodes may include: a cloud platform 110, at least one access node 120, a transmission network 130, and at least one terminal device 140.

In some examples of the present disclosure, the cloud platform 110 may refer to an abstraction of the underlying infrastructure of the IoT, the resources and services of which may be obtained over a transmission network by components of the IoT in an on-demand and scalable manner, for example, through network virtualization techniques.

The access node 120 is a network node that provides mutual access between a wireless workstation and a wired local area network.

The cloud platform 110 and the access node 120 are connected through the transmission network 130. The transmission network 130 is a transmission network providing transparent transmission channels for various professional networks. There are some switching devices on the transmission network 130. The switching devices may be referred to as transmission network nodes, whose function is to exchange data streams, including distributing and receiving data traffic, over the transmission channels through Ethernet ports. Therefore, in some examples of the present disclosure, an access node 120 is connected to at least one of the transmission network nodes 130. The cloud platform 110 is also connected to at least one transmission network node in the transmission network 130.

Typically, the transmission network 130 may employ optical fibers as a transmission medium, i.e., the access node 120 and the transmission network node may be interconnected through optical fibers, and the cloud platform 110 and the transmission network node may also be interconnected through optical fibers.

The terminal device 140 is a part of a perception layer of an IoT architecture, and may include: a temperature and humidity sensor, a QR code tag, a radio frequency identification (RFID) tag, a reader-writer, a camera, a global positioning system (GPS) and other perception terminals.

The terminal device 140 may be connected to the at least one access node 130 through a wireless channel.

The cloud platform 110, the at least one access node 120, the transmission network 130 and the at least one terminal device 140 also constitute an IoT system. To realize the traffic prediction for each node in the IoT system, the system of traffic prediction for IoT nodes shown in FIG. 1 can comprehensively utilize memory resources, computing resources and traffic data information of the cloud platform 110 and the access node 120 in the IoT system to achieve the purposes of optimizing the traffic prediction process and improving the accuracy of the traffic prediction.

Specifically, to complete the traffic prediction for an IoT node, the at least one access node 120 firstly collects traffic data of the IoT node. Here, the traffic data may include date, time, duration, size, path information of the traffic, and an identification (ID) of a node collecting such information, wherein the path information may include an IP address and port information of a source/destination node of the traffic.

The access node 120, after collecting the traffic data thereof, further clusters the traffic data according to the path information in the traffic data, to obtain access traffic data and network traffic data. Wherein the access traffic data refers to traffic data between the access node 120 and the terminal device 140 and can be denoted by $f_t^{access}$, and. The network traffic data refers to traffic data between the access node 120 and related transmission network nodes in the transmission network or between the access nodes 120, and can be denoted by $f_t^{network}$.

In addition, the access node 120 is provided with an access traffic prediction model that takes historical access traffic data as input and outputs an updated access traffic prediction model and a prediction result of access traffic at a next moment.

In some examples of the present disclosure, the access traffic prediction model may be implemented by a long and short-term memory network (LSTM), a recurrent neural network (RNN), or a gated recurrent unit (GRU).

Furthermore, the access node 120 may upload the network traffic data collected thereby and the prediction result of access traffic at the next moment predicted thereby to the cloud platform 110 through the transmission network 130.

The cloud platform 110 is provided with a network traffic prediction model that takes historical network traffic data of each access node as input and outputs an updated network traffic prediction model and a prediction result of network traffic at a next moment for each access node. In addition, the cloud platform 110 also obtains a prediction result of traffic for each node, respectively, according to the prediction result of network traffic at the next moment for each access node and the prediction result of access traffic at the next moment reported by each access node, thereby completing the traffic prediction for the IoT nodes.

In some examples of the present disclosure, the network traffic prediction model described above may be implemented by an LSTM, an RNN, or a GRU.

It should be noted that, unless otherwise specified, the size of the traffic described in this disclosure does not exceed the channel capacity of wireless channels of the transmission network and access network, nor does it exceed the limits of the cloud, transmission network nodes and terminal devices.

The detailed structure for each device in the system 100 of traffic prediction for IoT nodes will be described in detail with reference to the accompanying drawings.

Figure 2:
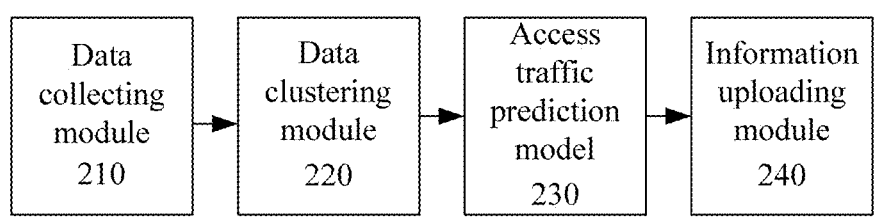
FIG. 2 is a diagram of an internal structure of an access node according to some examples of the present disclosure.

FIG. 2 shows a schematic diagram of an internal structure of an access node 120 according to some examples of the present disclosure.

As shown in FIG. 2, in an example of the present disclosure, an access node 120 may include: a data collecting module 210, a data clustering module 220, an access traffic prediction model 230, and an information uploading module 240.

Specifically, the data collecting module 210 is to collect traffic data of the access node.

As described above, in some examples of the present disclosure, the traffic data information may include date, time, duration, size, path information of the traffic and an ID of a node collecting such information, wherein the path information may include an IP address and port information of a source/destination node of the traffic.

The data collecting module 210, after collecting the traffic data of the access node, can store the collected traffic data in a database thereof in a format of a tuple, i.e., <date, time, duration, size of traffic, source node IP, destination node IP, source node port, destination node port, collection node ID>.

In some examples of the present disclosure, the data collecting module 210 may collect time-series data as the traffic data through Net Flow technology.

In addition, since the number of terminal devices is not within a certain range, and wireless channels are frequently established and released, the path information generated between the terminal device and the access node often fails to satisfy the requirement of a stable input dimension, and thus cannot be utilized. Therefore, in other examples of the present disclosure, if traffic data information is generated between the access node and a transmission network node in the transmission network or between access nodes, the path information thereof needs to be recorded. However, if the traffic data information is generated between the terminal device and the access node, the path information can be directly marked as the access traffic, for example, recorded as Nan, without recording the IP address and port information of the source/destination node of the traffic, so that the purpose of saving storage space can be achieved.

The data clustering module 220 is to cluster the traffic data collected by the data collecting module 210 according to the path information thereof and classifying the traffic data into the access traffic data and the network traffic data. Specifically, the data clustering module 220 may determine whether the traffic data is the access traffic data or the network traffic data based on the source node IP and the destination node IP in the path information of the traffic data.

The access traffic prediction model 230 is to take the access traffic data as input and output a prediction result of access traffic at a next moment $r_{t+1}^{access,p}$. It should be noted that in the expression $r_{t+1}^{access,p}$ and in the following expressions, t denotes the current moment; t+1 denotes the next moment; access denotes the access traffic; network denotes network traffic; p denotes the current access node p.

Further, in some examples of the present disclosure, the access traffic prediction model 230 may further add the access traffic data to a training set and perform a real-time training to update the access traffic prediction model 230.

The information uploading module 240 is to upload the prediction result of access traffic at the next moment $r_{t+1}^{access,p}$ output by the access traffic prediction model 230 and the network traffic data to the cloud platform.

Specifically, in some examples of the present disclosure, the information uploading module 240 may directly upload the prediction result of access traffic at the next moment $r_{t+1}^{access,p}$ and the network traffic data to the cloud platform.

In other examples of the present disclosure, the volume of data to be forwarded at each access node 120 can also be measured first. Therefore, the access node 120 without heavy burdens of forwarding data can upload the network traffic data to the cloud platform 110. However, the access node 120 with heavier burdens of forwarding data may suspend uploading the network traffic data to the cloud platform 110, so as to guarantee the priority of the task of forwarding data. Specifically, in these examples, the information uploading module 240 may first compare the prediction result of the access traffic at the next moment $r_{t+1}^{access,p}$ output by the access traffic prediction model 230 with the traffic threshold $h_t$ set for the access node corresponding to the current moment t, when $r_{t+1}^{access,p} < h_t^p$, the information uploading module 240 may determine that the burden of forwarding data on the access node 120 is not heavy, and upload the prediction result of access traffic at the next moment $r_{t+1}^{access,p}$ and the network traffic data to the cloud platform 110; when $r_{t+1}^{access,p} \geq h_t^p$, the information uploading module 240 may determine that the burden of forwarding data on the access node 120 is heavy, and back up the network traffic data locally at first, as well as uploading the prediction result of access traffic at the next moment $r_{t+1}^{access,p}$ and the size of the network traffic data $s_t^p$ to the cloud platform 110. Such an operation can make the best of the advantage of storage resource of the cloud platform 110 by transferring the storage task of the access node 120 without heavy burdens of forwarding data to the cloud platform 110, so that limited edge computing resources of the access node 120 can be spared, and the network operation and maintenance cost can be reduced. It should be noted that the traffic threshold $h_t$ for the access node 120 corresponding to the current moment t is determined and issued to each access node 120 by the cloud platform 110 according to the physical traffic limit for each access node 120 and the prediction result of network traffic at the last moment t−1.

Furthermore, the information uploading module 240 can be further used for uploading the network traffic data backed up locally to the cloud platform 110 in chronological order according to the size of the local data required to be uploaded to the cloud platform at the next moment issued from the cloud platform 110.

In some examples of the present disclosure, the access node 120 may further include a data cleaning module between the data collecting module 210 and the data clustering module 220, the data cleaning module is to clean incomplete data records, repeated data records and records roaming to the local in the traffic data information collected by the data collecting module 210, and then send the cleaned traffic data information to the data clustering module 220. In this solution, the traffic data information collected by the access node 120 is sample-edited and then uploaded to the cloud platform 110, so that the burden on a transmission channel can be greatly reduced while reserving effective information.

In some examples of the present disclosure, the access node 120 may further include a data conversion module between the data clustering module 220 and the access traffic prediction model 230, the data conversion module is to convert the access traffic data into a data format of a training set for the access traffic prediction model. Specifically, the data format of the training set for the access traffic prediction model may be pandas.DataFrame, csv, or xlsx.

Figure 3:
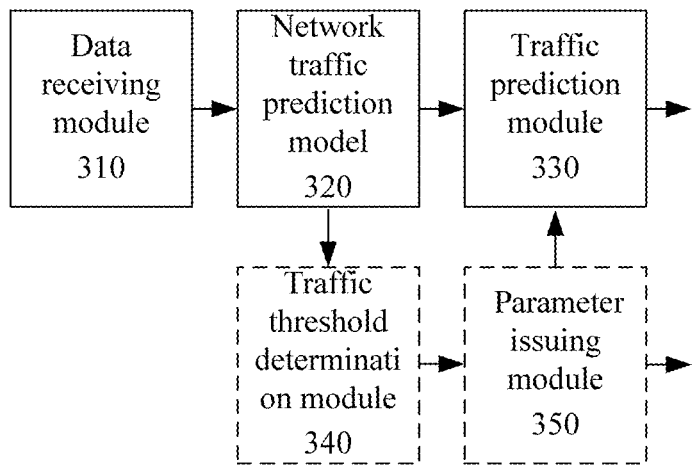
FIG. 3 is a schematic diagram of an internal structure of a cloud platform according to some examples of the present disclosure.

FIG. 3 shows a schematic diagram of an internal structure of the cloud platform 110 according to some examples of the present disclosure. As shown in FIG. 3, in examples of the present disclosure, the cloud platform 110 may include: a data receiving module 310, a network traffic prediction model 320, and a traffic prediction module 330.

In some examples of the present disclosure, the data receiving module 310 is to receive network traffic data reported by each access node and the prediction result of access traffic at a next moment through the transmission network.

The network traffic prediction model 320 is to obtain the prediction result of network traffic for each access node at the next moment by taking the network traffic data as input. For example, for a node p, a prediction result of traffic to be forwarded for a port n thereof can be recorded as $r_{t+1}^{network,p,n}$; and a prediction result of traffic to be forwarded for the node p can be recorded as $r_{t+1}^{network,p}$.

Further, in some examples of the present disclosure, the network traffic prediction model 320 may further add the network traffic data to the training set and perform a real-time training, to update the network traffic prediction model 320.

The traffic prediction module 330 is to determine and output the prediction result of traffic at the next moment for each access node, respectively, according to the prediction result of access traffic at the next moment for each access node, the prediction result of network traffic at the next moment and data to be uploaded to the cloud platform at the next moment.

In examples of the present disclosure, the prediction result of traffic at the next moment for the access node p may be determined through the following equation.

$$r_{t+1}^{p} = r_{t+1}^{network,p} + r_{t+1}^{access,p}$$

Furthermore, in other examples of the present disclosure, the cloud platform 110 may further include: a traffic threshold determination module 340 and a parameter issuing module 350.

The traffic threshold determination module 340 is to determine the traffic threshold for each access node corresponding to the next moment according to the prediction result of network traffic for each access node, respectively.

In the following, taking the access node p as an example, the method for determining the traffic threshold for each access node corresponding to the next moment p by the traffic threshold determination module 340 will be described in detail.

Firstly, the traffic threshold for a port n at an access node p corresponding to the next moment is calculated according to the prediction result of traffic $r_{t+i}^{network,p,n}$ to be forwarded at the next moment for the port n of the node p through the following equation:

$$h_{t+1}^{p,n} = m_0 - \Sigma_i r_{t+1}^{network,p,i}, i \in I$$

where $m_0$ represent a physical maximum bearing traffic limit for the access node; I represent a set of ports having path dependencies with the port n.

Secondly, the traffic threshold determination module 340 may calculate the traffic threshold for the port n of the access node p corresponding to the next moment according to the traffic threshold for the port not the access node p corresponding to the next moment through the following equation:

$$h_{t+1}^{p} = \Sigma_n h_{t+1}^{p,n}, n \in N$$

where, N represent a set of all ports of the access node p.

The parameter issuing module 350 is to issue the traffic threshold for each access node corresponding to the next moment to the corresponding access node, respectively.

Furthermore, the parameter issuing module 350 can further to determine the size of the local data required to be uploaded to the cloud platform at the next moment for each access node, and issue the size of the local data required to be uploaded to the cloud platform at the next moment for each access node to the corresponding access node, respectively.

Specifically, in some examples of the present disclosure, the parameter issuing module 350 may determine the size of the data required to be uploaded to the cloud platform at the next moment by the access node p through the following method.

When $h_{t+1}^{p} > 0$, the size of the local data required to be uploaded to the cloud platform by the access node at the next moment may be set as $k_{t+1}^{p} = s_{t}^{p} - s_{t-1}^{p}$. That is, when $h_{t+1}^{p} > 0$, the size of the local data required to be uploaded to the cloud platform by the access node at the next moment is the volume of data newly collected from t-1 to t. After the access node uploads this volume of data, the volume of the data required to be stored locally by the access node remains unchanged, with no addition due to the newly collected data.

When $h_{t+1}^{p} \leq 0$, the size of local data required to be upload to the cloud platform by the access node at the next moment may be set as $k_{t+1}^{p} = 0$. In this case, the parameter issuing module 350 may further send alarm information to the access node p and establish a standby link, so as to divert the traffic accessing the node p to other access nodes as much as possible.

It should be noted that in this case, the traffic prediction module 330 will determine the prediction result of traffic at the next moment for the access node p according to the following equation:

$$r_{t+1}^{p} = r_{t+1}^{network,p} + r_{t+1}^{access,p} + k_{t+1}^{p}$$

With the prediction result of traffic for each access node at the next moment determined, the network load balance can be dynamically optimized for the IoT system on the basis of the results. Specifically, from the perspective of nodes, purposeful resource reservation can be carried out according to the ratio of the access traffic to be processed at the next moment for the node to the network traffic; the access admission mechanism for the terminal device can be adjusted to avoid access congestion. From the perspective of the network, the routing, modulation and spectrum allocation strategies can be adjusted in real-time according to the prediction result of traffic for each node, so that the switching and distribution of data streams is directed towards the overall optimization of the whole network.

As can be seen, the system of traffic prediction for IoT nodes can predict a relatively long-term network traffic trend by utilizing the cloud platform 110. Also, the system of traffic prediction for IoT nodes can predict a relatively short-term access traffic change by utilizing the access nodes. Further, by combining the relatively long-term network traffic trend and the relatively short-term access traffic change, one-sidedness and limitation caused by a single position of a prediction module in a network and a single time granularity configuration can be avoided, thus, accuracy of traffic prediction for the system can be greatly improved. Furthermore, the access traffic prediction model and the network traffic prediction model have good cycle stability, with no significant change in performance after a plurality of tests and experiments.

In addition, it can be seen that the traffic prediction system requires sharing and coordination of storage, computing resources and traffic data information between the cloud platform 110 and the access node 120 (which may also be referred to as an edge node), and in examples of the present disclosure, the coordination may be referred to as edge cloud coordination.

It is to be noted that the solution above has neither special limitations on the network topology, the number of nodes and the number of terminal devices deployed in the IoT system, nor explicit limitations on the access mechanism and access time thereof. The accompany drawings are all simplified schematic diagrams of computer network components, intended only to show the logical positions and basic functions of the components.

Figure 4:
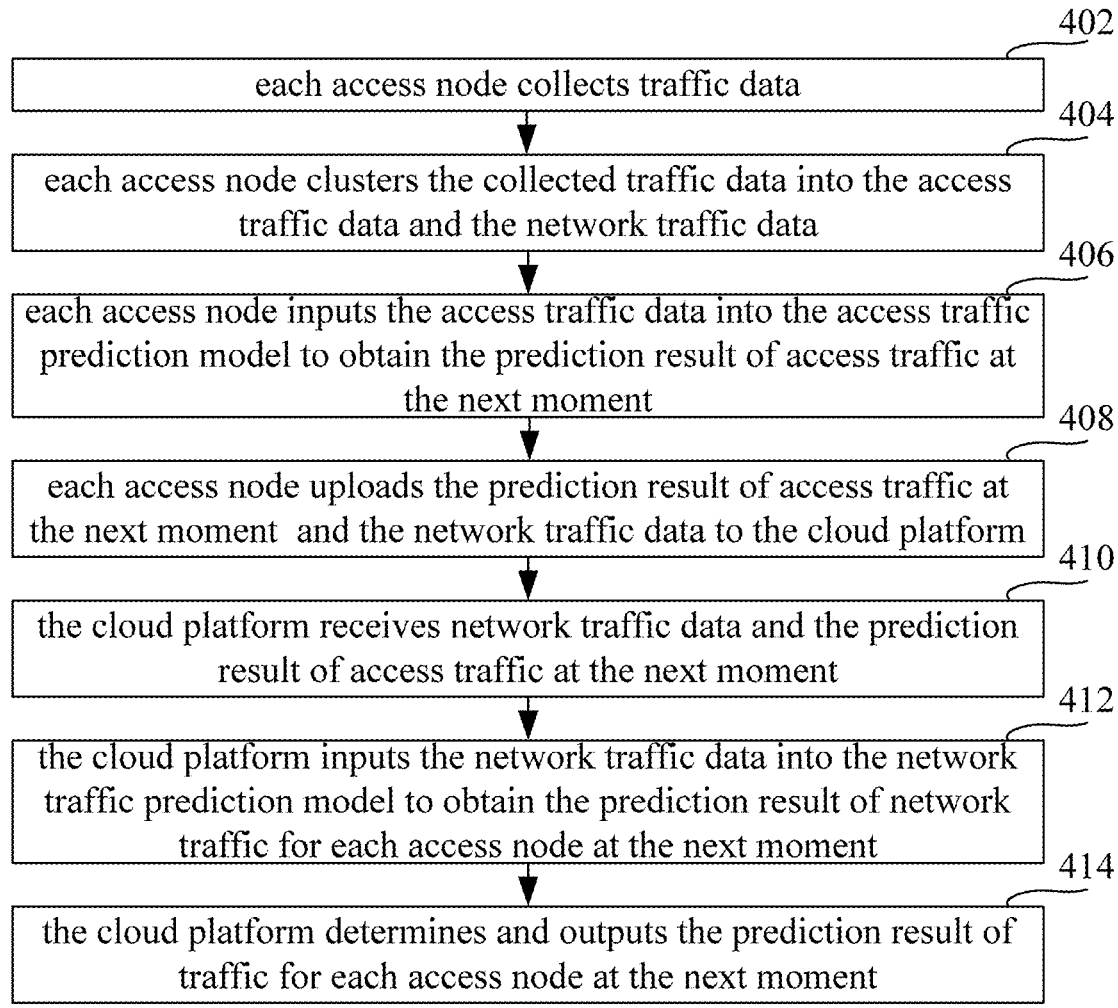
FIG. 4 is a flow chart of a method of traffic prediction for IoT nodes according to some examples of the present disclosure.

Corresponding to the system of traffic prediction for IoT nodes, the disclosure also discloses a method of traffic prediction for IoT nodes. FIG. 4 shows a flow chart of the method of traffic prediction for IoT nodes according to some examples of the present disclosure. As shown in FIG. 4, the method may include the following steps.

In block 402, each access node collects traffic data, respectively.

As described above, in some examples of the present disclosure, the traffic data information may include date, time, duration, size, path information of the traffic and an ID of a node collecting such information, wherein the path information may include an IP address and port information of a source/destination node of the traffic.

The traffic data of the current access node, after being collected, can be stored in a database in the format of a tuple, i.e., <date, time, duration, size of traffic, source node IP, destination node IP, source node port, destination node port, collection node ID>.

In some examples of the present disclosure, each access node may collect time series data as the traffic data through Net Flow technology.

In addition, in other examples of the present disclosure, if traffic data information is generated between the access node and a transmission network node in the transmission network or between access nodes, the path information thereof needs to be recorded; however, if the traffic data information is generated between a terminal device and the access node, the path information can be directly marked as the access traffic, for example, recorded as Nan.

In block 404, each access node clusters the collected traffic data according to the path information thereof and classifies the collected traffic data into the access traffic data and the network traffic data.

Specifically, each access node can determine whether the traffic data is the access traffic data or the network traffic data according to the source node IP and the destination node IP in the path information of the traffic data.

In other examples of the present disclosure, between block 402 and block 404, the method may further include: cleaning up incomplete data records, repeated data records and records roaming to the local in collected traffic data information. In this solution, the traffic data information collected by the access node can be sample-edited and then uploaded to the cloud platform, so that the burden on a transmission channel can be greatly reduced while effective information can be reserved.

In block 406, each access node inputs the access traffic data into the access traffic prediction model configured thereon, respectively, to obtain the prediction result of access traffic at the next moment $r_{t+1}^{access,p}$ output by the traffic prediction model.

Furthermore, in some examples of the present disclosure, in block 406, the access traffic data may be further added to the training set of the traffic prediction model and the traffic prediction model may be trained in real-time to complete an update.

In other examples of the present disclosure, each access node may further convert the access traffic data into a data format of the training set of the access traffic prediction model before inputting the access traffic data into the access traffic prediction model. Specifically, the data format of the training forest of the access traffic prediction model may be pandas.DataFrame format, csv, or xlsx.

In block 408, each access node uploads the prediction result of access traffic at the next moment $r_{t+1}^{access,p}$ and the network traffic data to the cloud platform, respectively.

Specifically, in some examples of the present disclosure, the access node p may directly upload the prediction result of access traffic at the next moment $r_{t+1}^{access,p}$ and the network traffic data to the cloud platform.

In other examples of the present disclosure, the access node p may first compare the prediction result of access traffic at the next moment $r_{t+1}^{access,p}$ output by the access traffic prediction model with the traffic threshold $h_t$ for the access node p corresponding to the current moment t. When $r_{t+1}^{access,p} < h_t^p$, the access node p may upload the prediction result of access traffic at the next moment $r_{t+1}^{access,p}$ and the network traffic data to the cloud platform. However, when $r_{t+1}^{access,p} \geq h_t^p$, the access node p may back up the network traffic data locally, and upload the prediction result of access traffic at the next moment $r_{t+1}^{access,p}$ and the size of the network traffic data $s_t^p$ to the cloud platform. Such an operation can make the best of the advantage of the storage resource of the cloud platform by transferring the storage task of the access node 120 without heavy burdens of forwarding data to the cloud platform, so that limited edge computing resources of the access node can be spared, and the network operation and maintenance cost can be reduced.

In block 410, the cloud platform receives network traffic data and the prediction result of access traffic at the next moment reported by each access node.

In some examples of the present disclosure, the cloud platform may receive the information through the transmission network.

In block 412, the cloud platform inputs the network traffic data into the network traffic prediction model to obtain the prediction result of network traffic for each access node at the next moment output by the network traffic prediction model.

Furthermore, in some examples of the present disclosure, the cloud platform may further add the network traffic data to the training set of the network traffic prediction model and perform a real-time training to update the network traffic prediction model.

In block 414, the cloud platform determines and outputs the prediction result of traffic for each access node at the next moment according to the prediction result of access traffic for each access node at the next moment and the prediction result of network traffic at the next moment.

In some examples of the present disclosure, the cloud platform may determine the prediction result of traffic at the next moment for the access node p through the following equation:

$$r_{t+1}^p = r_{t+1}^{network,p} + r_{t+1}^{access,p}$$

In other examples of the present disclosure, the step of determining the prediction result of traffic for each access node at the next moment by the cloud platform according to the prediction result of access traffic for each access node at the next moment and the prediction result of network traffic at the next moment may include the following steps.

In block 4142, the traffic threshold for each access node corresponding to the next moment is determined, respectively, according to the prediction result of network traffic for each access node.

Taking the access node p as an example, firstly, the traffic threshold for a port n at an access node p corresponding to the next moment is calculated according to the prediction result of traffic $r_{t+1}^{network,p,n}$ to be forwarded at the next moment for the port n of the node p through the following equation:

$$h_{t+1}^{p,n} = m_0 - \Sigma_i r_{t+1}^{network,p,i}, \ i \in I$$

where, $m_0$ is the physical maximum bearing traffic limit for the access node; I is a set of ports having path dependencies with the port n.

Secondly, the traffic threshold determination module calculates the traffic threshold for the port n of the access node p corresponding to the next moment according to the traffic threshold for the port n of the access node p corresponding to the next moment through the following equation $$h_{t+1}^{p} = \Sigma_n h_{t+1}^{p,n}, \ n \in N$$

where, N is a set of all ports of the access node p.

In block 4144, the size of the local data required to be uploaded to the cloud platform at the next moment by each access node is determined.

Specifically, in some examples of the present disclosure, the parameter issuing module 350 may determine the size of the data required to be uploaded to the cloud platform at the next moment by the access node p through the following method.

When $h_{t+1}^{P} > 0$, the size of the local data required to be uploaded to the cloud platform by the access node at the next moment may be set as $k_{t+1}^{P} = s_t^{P} - s_{t-1}^{P}$.

When $h_{t+1}^{P} \leq 0$, the size of local data required to be uploaded to the cloud platform by the access node at the next moment may be set as $k_{t+1}^{P} = 0$. In this case, the parameter issuing module 350 may further send alarm information to the access node p and establish a standby link, so as to divert the traffic accessing the node p to other access nodes as much as possible.

In block 4146, the size of the local data required to be uploaded to the cloud platform at the next moment by each access node and the traffic threshold for each access node corresponding to the next moment are issued to the corresponding access node, respectively.

In block 4148, the prediction result of traffic for each access node at the next moment is determined, respectively, according to the prediction result of access traffic for each access node at the next moment, the prediction result of network traffic at the next moment and the size of the data required to be uploaded to the cloud platform at the next moment.

In some examples of the present disclosure, the prediction result of traffic at the next moment for the access node p may be determined through the following equation.

$$r_{t+1}^{P} = r_{t+1}^{network,p} + r_{t+1}^{access,p} + k_{t+1}^{P}$$

As can be seen, the method of traffic prediction for IoT nodes can predict a relatively long-term network traffic trend by utilizing the cloud platform. Also, the method of traffic prediction for IoT nodes can predict a relatively short-term access traffic change by utilizing the access nodes. Further, by combining the relatively long-term network traffic trend and the relatively short-term access traffic change, one-sidedness and limitation caused by a single position of a prediction module in a network and a single time granularity configuration can be avoided, thus, accuracy of traffic prediction for the system can be greatly improved. Furthermore, the access traffic prediction model and the network traffic prediction model have good cycle stability, with no significant change in performance after a plurality of tests and experiments.

Figure 5:
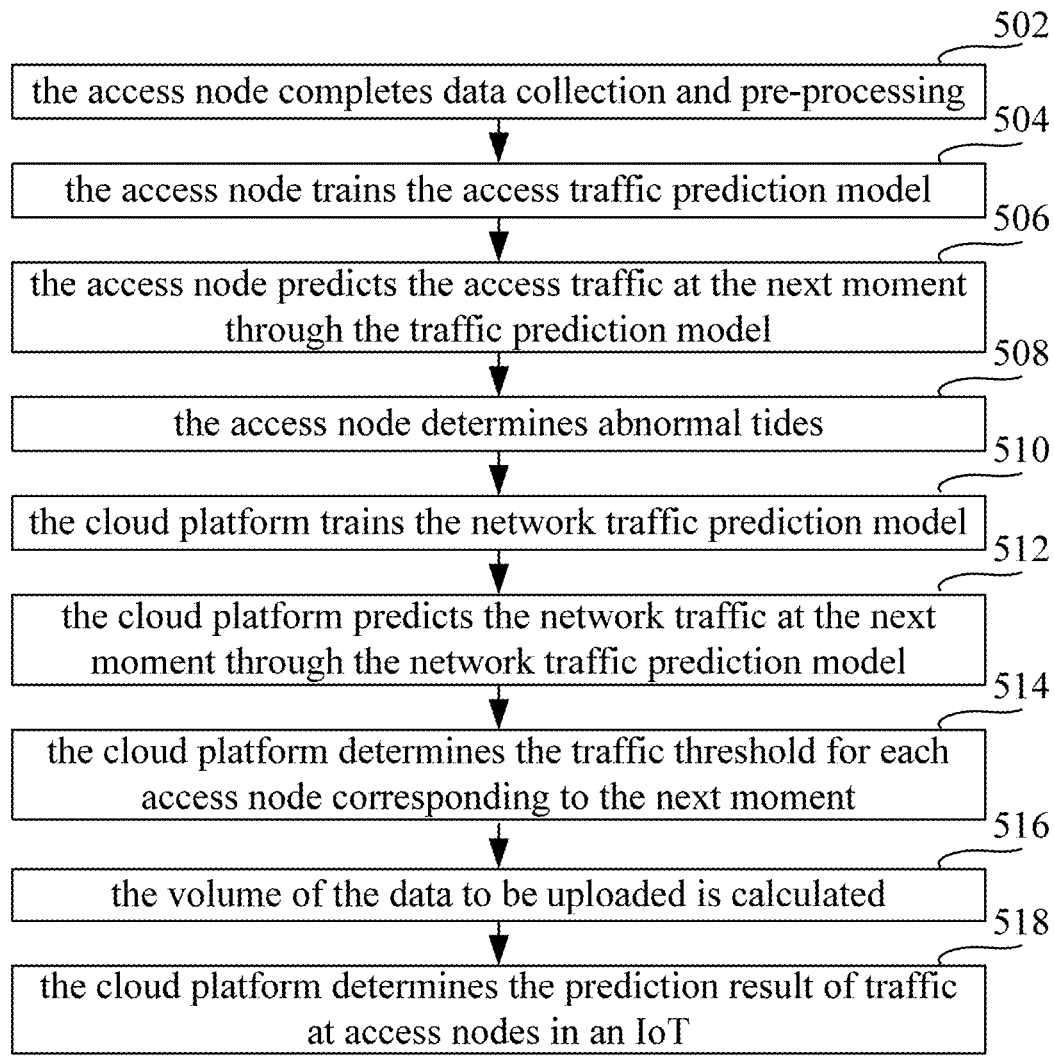
FIG. 5 is an exemplary flow chart of a method of traffic prediction for IoT nodes according to some examples of the present disclosure.

The method of the present disclosure will now be described in further detail with reference to the accompanying drawings and specific examples. FIG. 5 illustrates an IoT node traffic prediction process according to an example of the present disclosure. In this example, the system of traffic prediction for IoT nodes may be specifically configured as follows: the temporal granularity is set to be 5 ms, the short-term traffic prediction model deployed at each access node may be set to be an RNN based on Tensor traffic 1.2.1 in Python 2.6, and the long-term traffic prediction model deployed at the cloud platform may be set to be an LSTM based on Tensor traffic 1.2.1 in Python 2.6. The system of traffic prediction for IoT nodes may complete the traffic prediction for the IoT nodes through the following process.

In block 502, the access node completes data collection and pre-processing.

In some examples of the present disclosure, each access node may use the data collecting module thereof to collect traffic data information between the current access node and the terminal access device, between the current access node and each associated transmission network node, and between the current access node and each associated access node, and store the traffic data information in the database in a format of a tuple <traffic date, time, duration, size, source node IP, destination node IP, source node port, destination node port, collection node ID>.

Furthermore, each access node may further clean incomplete data records, repeated data records and records roaming to the local in the database thereof.

Next, each access node may further cluster the collected traffic data information according to the path information, and classifies the collected traffic data information into the access traffic and the network traffic, wherein the access traffic is traffic data information between the access node and the terminal access device, denoted by $f_t^{access}$. The network traffic is the traffic data information between the access node and each related transmission network node and between the access node and each related access node, denoted by $f_t^{network}$.

In block 504, the access node trains the access traffic prediction model.

In some examples of the present disclosure, each access node may add the access traffic into a training set and inputs it to the access traffic prediction model for training. When the access traffic prediction model is trained, the access traffic at the next moment (i.e., the previous t moments) is predicted according to the access traffic at the previous t−1 moments to obtain a prediction result of access traffic for each moment, and the parameters of the access traffic prediction model may be adjusted according to the difference between the prediction result of access traffic for each moment and the actual access traffic, so as to implement the training of the model.

That is, in the solution of the present disclosure, one RNN access traffic prediction model needs to be trained for each different access node in the IoT system, respectively.

In block 506, the access node predicts the access traffic at the next moment through the traffic prediction model.

Specifically, after the training of the access traffic prediction model is completed, at moment t, the input into the access traffic prediction model is the access traffic at the moment t, and the output from the access traffic prediction model is the prediction result $r_{t+1}^{access}$ of access traffic at moment t+1.

In block 508, the access node determines abnormal tides.

At moment t, an access node $P_i$ compares the prediction result of access traffic $r_{t+1}^{access}$ with the traffic threshold $h_t$ at the moment t thereof and determines their relationship. When $r_{t+1}^{access} < h_t$, the access node $P_i$ uploads the network traffic acquired by the access node to the cloud platform; and when $r_{t+1}^{access} \geq h_t$, the access node $P_i$ backs up the network traffic locally, and uploads the size of the network traffic $s_t$ to the cloud platform.

For example, at 1835 ms, the access node $P_7$ corresponds to a traffic threshold $h_t = h_{1835} = 2.4$ Mb/s, and the prediction result of access traffic output by the access traffic prediction model is $r_{t+1}^{access} = r_{1840}^{access} = 2.1$ Mb/s, as such, it is determined that $r_{t+1}^{access} < h_t$, the access node $P_7$ uploads traffic data information, i.e., network traffic, between itself and each related transmission network node and between itself and each related access node to the cloud platform after cleaning and sample-editing, with a total size of 2 Mb. In addition, the access traffic can be added to the set of training samples at 1840 ms.

In another example, at 2790 ms, the access node $P_{19}$ corresponds to the traffic threshold $h_t = h_{2790} = 3.3$ Mb/s, and the prediction result of access traffic output by the access traffic prediction model is $r_{t+1}^{access} = r_{2795}^{access} = 4.1$ Mb/s, as such, it is determined that $r_{t+1}^{access} \geq h_t$, the access node backs the access traffic and the network traffic up locally, and only uploads the information $s_t = s_{2790} = 13$ kb of the size of the network traffic data information to the cloud platform. In addition, the access traffic can be added to the set of training samples at 2795 ms.

In block 510, the cloud platform trains the network traffic prediction model.

In some examples of the present disclosure, the cloud platform adds the network traffic into a training set and inputs it to the network traffic prediction model for training. When the network traffic prediction model is trained, the network traffic at the next moment (i.e., the previous t moments) is predicted according to the network traffic at the previous t−1 moments to obtain a prediction result of network traffic for each moment, and the parameters of the network traffic prediction model are adjusted according to the error between the prediction result of network traffic for each moment and the actual network traffic, so as to implement the training of the model.

In block 512, the cloud platform predicts the network traffic at the next moment through the network traffic prediction model.

Specifically, after training of the network traffic prediction model is completed, at moment t, the input into the network traffic prediction model is the network traffic at moment t between nodes reported by each access node, and the output from the network traffic prediction model is the prediction result $r_{t+1}^{access}$ of access traffic at moment t+1.

In block 514, the cloud platform determines the traffic threshold for each access node corresponding to the next moment.

In some examples of the present disclosure, the cloud platform may calculate the traffic threshold for each access node corresponding to the next moment according to the prediction result of network traffic for each access node $r_{t+1}^{network}$. Specifically, the cloud platform can calculate the traffic threshold for each access node corresponding to the next moment through the following equation.

$$h_{t+1} = m_0 - r_{t+1}^{network}$$

Where, $m_0$ is the physical maximum bearing traffic limit for the access node.

For example, the access node $P_7$ has a physical traffic limit of $m_0 = 15$ Mb/s. At 1835 ms, it is predicted that the prediction result of network traffic for the access node $P_7$ at 1840 ms is $r_{t+1}^{network} = r_{1840}^{network} = 9.4$ Mb/s. At this moment, the traffic threshold for the access node $P_7$ corresponding to the next moment can be obtained through the cloud platform calculation, which is $h_{t+1} = h_{1840} = m_0 - r_{t+1}^{network} = 5.6$ Mb/s.

In another example, the access node $P_{19}$ has a physical traffic limit of $m_0 = 15$ Mb/s. At 2790 ms, it is predicted that the prediction result of network traffic for the access node $P_{19}$ at 2795 ms is $r_{t+1}^{network} = r_{1840}^{network} = 5.8$ Mb/s. At this moment, the traffic threshold for the access node $P_{19}$ corresponding to the next moment can be obtained through the cloud platform calculation, which is $h_{t+1} = h_{1840} = m_0 - r_{t+1}^{network} = 9.2$ Mb/s.

In block 516, the volume of the data uploaded to the cloud platform is calculated.

At moment t, for the access node $P_i$, the cloud platform compares the information of the size $s_t$ of the traffic data information uploaded by the access node $P_i$ with the calculated traffic threshold $h_{t+1}$ for the access node $P_i$ corresponding to the next moment.

When $h_{t+1} > 0$, the size of the local data required to be uploaded to the cloud platform at the next moment by the access node $P_i$ is set to be $k_{t+1} = s_t - s_{t-1}$, and both $k_{t+1}$ and the threshold $h_{t+1}$ are issued to the access node $P_i$.

When $h_{t+1} \leq 0$, the size of the local data required to be uploaded to the cloud platform at the next moment by the access node $P_i$ is set to be $k_{t+1} = 0$, alarm information is sent to the access node $P_i$, and a standby link is established to divert the traffic accessing the node to other nodes as much as possible.

For example, at 1835 ms, the traffic threshold corresponding to the next moment for the access node $P_7$ satisfies $h_{t+1} = h_{1840} = 5.6$ Mb/s>0, and then the size of the local data to be uploaded to the cloud platform thereby at 1840 ms may be set to be $k_{t+1} = s_t - s_{t-1} = 0$.

In another example, at 2790 ms, the traffic threshold corresponding to the next moment for the access node $P_{19}$ satisfies $h_{t+1} = h_{1840} = 9.2$ Mb/s>0, and then the size of the local data required to be uploaded to the cloud platform thereby at 2795 ms may be set to be $k_{t+1} = s_t - s_{t-1} = 0.004$ Mb, i.e., the traffic required for uploading is 0.8 Mb/s.

In block 518, the cloud platform determines the prediction result of traffic at access nodes in an IoT.

At moment t, the process returns to the prediction result $r_{t+1} = r_{t+1}^{network} + r_{t+1}^{access} + k_{t+1}$ of traffic for the access node in the IoT at moment t+1.

For example, at 1835 ms, the prediction result of traffic for the access node $P_7$ is $r_{t+1} = r_{t+1}^{network} + r_{t+1}^{access} k_{t+1} = 9.4 + 2.1 + 0 = 11.5$ Mb/s, which does not exceed the physical traffic limit thereof and spares storage resources. In another example, at 2790 ms, the prediction result of traffic for the access node $P_{19}$ is $r_{t+1} = r_{t+1}^{network} + r_{t+1}^{access} + k_{t+1} = 5.8 + 4.1 + 0.8 = 10.7$ Mb/s.

Practically, at 1840 ms, an observation of traffic at the access node $P_7$ is 11.3 Mb/s. While at 2795 ms, an observation of traffic at the access node $P_{19}$ is 11.0 Mb/s.

In some examples of the present disclosure, the traffic data of the nodes can also be divided into a training set and a test set, and the training is carried out through cross-verification.

Figure 6:
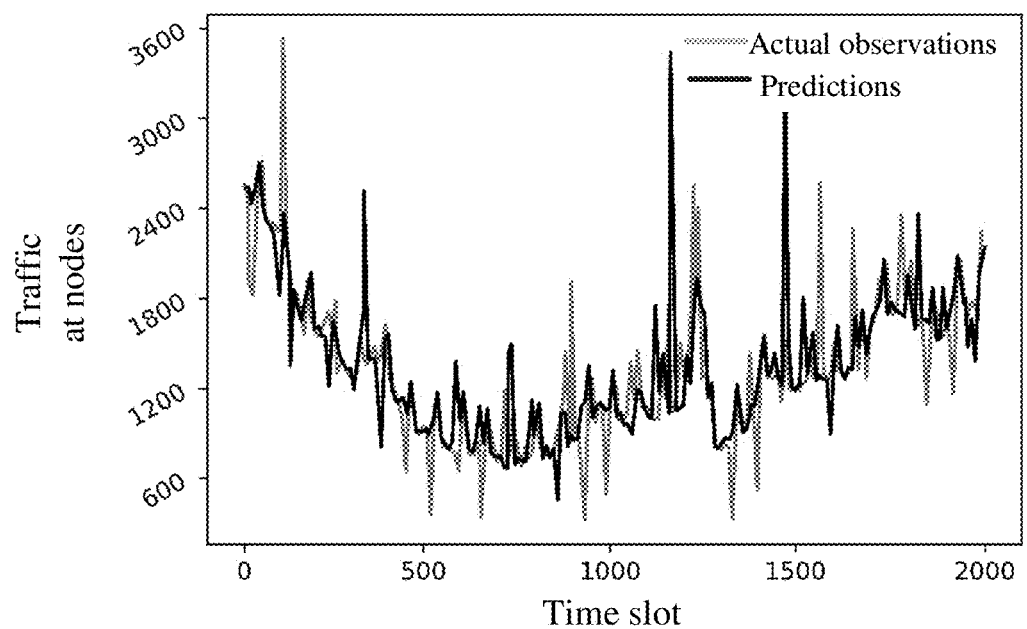
FIG. 6 is a schematic diagram illustrating an implementation result of the method of traffic prediction for IoT nodes according to some examples of the present disclosure.

In addition, to verify the performance of the solution of traffic prediction for IoT nodes, the above method is hereby compared with two methods in the prior art, including by only deploying an LSTM traffic prediction module at a cloud platform and only deploying an RNN traffic prediction module at an access node. The evaluation measure of the comparison is a SMAPE value between the prediction result of traffic and the actual traffic. Obviously, a smaller SMAPE value indicates a more accurate result, i.e., a better effect of the traffic prediction method. The comparison result shows that the SMAPE value of the examples of the present disclosure is smaller than that of the two methods in the prior art in multiple experiments, which proves a higher traffic prediction accuracy. FIG. 6 shows the prediction effect of the method of traffic prediction for IoT nodes provided by examples of the present disclosure. In FIG. 6, the horizontal axis represents time and the vertical axis represents the actual value of the prediction result of traffic at a node. As can be seen from FIG. 6, the method provided by examples of the present disclosure has a higher accuracy in traffic prediction.

It should be noted that the access node and the cloud platform in one or more examples of the present disclosure may be executed by a single device, such as a computer or server. The method using the access node and the cloud platform in examples of the disclosure can also be applied to a distributed scenario with the cooperation of a plurality of devices. In such a distributed scenario, one of the plurality of devices may perform only one or more of the steps of the method of one or more examples of the present disclosure, and the plurality of devices may interact with each other to perform the method described above.

The foregoing describes specific examples of the disclosure. Other examples are within the scope of the appended claims. In some cases, the operations or steps recited in the claims may be performed in a different order than in an example and still achieve the desired results. In addition, the processes depicted in the drawings do not necessarily require the particular order or sequential order shown to achieve the desired results. In some examples, multitasking and parallel processing may also be possible or may be advantageous.

For convenience of description, the apparatus above is described in terms of various functional modules. Of course, the functionality of the various modules may be implemented in one or more software and/or hardware when practicing one or more embodiments of the present disclosure.

The apparatus of the example above is used to implement the corresponding method previously described, and has the advantageous effect of the corresponding method, which will not be described in detail herein.

Figure 7:
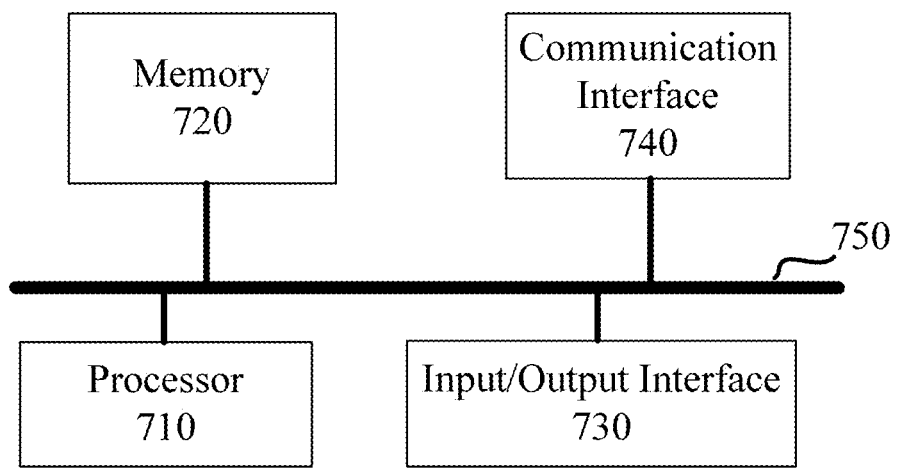
FIG. 7 is a schematic diagram of an internal structure of an electronic device according to some examples of the present disclosure.

FIG. 7 is a more detailed diagram of a structure of hardware of an electronic device according to an embodiment of the present disclosure, the device may include: a processor 710, a memory 720, an input/output interface 730, a communication interface 740, and a bus 750, wherein the processor 710, the memory 720, the input/output interface 730, and the communication interface 740 are in communication within the device via the bus 750. The electronic device can be used for realizing the functions of the access node or the cloud platform.

The processor 710 may be implemented as a general purpose Central Processing Unit (CPU), a microprocessor, an Application Specific Integrated Circuit (ASIC), or one or more integrated circuits for executing related programs to implement the method for predicting traffic at nodes in an IoT provided by the embodiments of the present disclosure.

The memory 720 may be implemented as ROM (Read Only Memory), RAM (Random Access Memory), static storage devices, dynamic storage devices, etc. The memory 720 may store an operating system and other application programs, and some related program codes are stored in the memory 720 and called for execution by the processor 710 when the method for predicting traffic at nodes in an IoT provided by the embodiments of the present disclosure is implemented in software or firmware.

The input/output interface 730 is used for interfacing the input/output (I/O) modules to realize information input and output. The I/O modules may be configured as components in a device (not shown) or external to the device to provide corresponding functionality, wherein the input device can include a keyboard, a mouse, a touch screen, a microphone, various sensors and the like, and the output device can include a monitor, a loudspeaker, a vibrator, an indicator lamp and the like.

The communication interface 740 is used for connecting a communication module (not shown) to enable communication interaction of the present device with other devices. The communication module can realize communication in a wired mode, such as USB and cables, and can also realize communication in a wireless mode, such as a mobile network, WiFi, and Bluetooth.

The bus 750 includes a channel for transferring information among components of the device, such as the processor 710, the memory 720, the input/output interface 730, and the communication interface 740.

It should be noted that although the device above only shows the processor 710, the memory 720, the input/output interface 730, the communication interface 740, and the bus 750, in specific implementations, the device may include other components necessary for proper operation. Moreover, those skilled in the art will appreciate that the device above may also include only the components necessary to implement the embodiments of the present disclosure instead of all of the components shown in the drawings.

The computer-readable media of this example, including permanent and non-permanent, removable and non-removable media, may implement information storage through any method or technique. The information may be computer-readable instructions, data structures, modules of a program, or other data. Examples of storage media for a computer include, but are not limited to, phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape and magnetic disk storage or other magnetic storage devices, or any other non-transmission medium, which can be used to store information accessible by a computing device.

One of ordinary skill in the art will appreciate that the discussion of any of the embodiments above is merely exemplary and is not intended to imply that the scope of the disclosure, including the claims, is limited to these examples; combinations of features in the embodiments above or in other embodiments are also possible without departing the spirit of the present disclosure, the steps may be performed in any order, and many other variations of different aspects of one or more embodiments of the present disclosure as described above exist, which are not provided in detail for the sake of brevity.

In addition, well-known power/ground connections to integrated circuit (IC) chips and other components may be shown or not in the drawings provided for simplicity of illustration and discussion, avoiding obscuring one or more embodiments of the present disclosure. Moreover, an apparatus may be shown in a block diagram to avoid obscuring one or more embodiments of the present disclosure, and this also takes into account the fact that the details of implementations of the apparatus shown in the block diagram are highly dependent on the platform where one or more embodiments of the present disclosure are to be implemented (i.e., such details should be readily perceivable by one skilled in the art). Where specific details (e.g., circuits) are set forth to describe exemplary embodiments of the disclosure, it will be apparent to one skilled in the art that one or more embodiments of the disclosure may be practiced without these specific details or with variations of these specific details. Accordingly, the description is to be regarded as illustrative but not restrictive.

While the present disclosure has been described in conjunction with specific embodiments thereof, many alternatives, modifications, and variations thereof will be apparent to those of ordinary skill in the art in light of the foregoing description. For example, other memory architectures (e.g., dynamic RAM (DRAM)) may use the embodiments discussed.

It is intended that one or more embodiments of the disclosure cover all such alternatives, modifications, and variations as fall within the broad scope of the appended claims. Accordingly, any omissions, modifications, equivalents, improvements, and the like which come within the spirit and scope of one or more embodiments of the present disclosure are intended to be embraced therein.

What is claimed is:

1. A system of traffic prediction for Internet of Things (IoT) nodes, comprising at least one access node, a transmission network and a cloud platform; wherein
the at least one access node is configured to collect traffic data, cluster the traffic data according to path information in the traffic data to obtain access traffic data and network traffic data, input the access traffic data into an access traffic prediction model configured, output a prediction result of the access traffic at a next moment, and upload the network traffic data and the prediction result of the access traffic at the next moment to the cloud platform through the transmission network, and
the cloud platform is configured to input the network traffic data uploaded by the at least one access node into a network traffic prediction model configured, output a prediction result of the network traffic for each access node at a next moment, and obtain a prediction result of traffic for each node according to the prediction result of the network traffic at the next moment for each access node and the prediction result of the access traffic at the next moment received from each access node.

2. The system according to claim 1, wherein the traffic data information comprises: date, time, duration, size, path information of the traffic and an ID of a node collecting information, wherein the path information comprises an IP address and port information of a source node and an IP address and port information of a destination node of the traffic;

after collecting the traffic data, the at least one access node stores the collected traffic data in a database in a format of a tuple; and
the at least one access node determines whether the traffic data is the access traffic data or the network traffic data based on the source node IP and the destination node IP in the path information of the traffic data.

3. The system according to claim 1, wherein, the at least one access node compares the prediction result of the access traffic at the next moment with a traffic threshold for the access node corresponding to the current moment $h_t^p$, and uploads the prediction result of access traffic at the next moment and the network traffic data to the cloud platform when the prediction result of access traffic at the next moment is smaller than $h_t^p$.

4. The system according to claim 1, wherein, when the prediction result of access traffic at the next moment is greater than or equal to $h_t^p$, the at least one access node backs up the network traffic data locally, and uploads the prediction result of access traffic at the next moment and a size of the network traffic data $s_t^p$ to the cloud platform.

5. The system according to claim 1, wherein, the access node further cleans incomplete data records, repeated data records and records roaming to the local in the traffic data information collected before clustering the traffic data.

6. The system according to claim 1, wherein, the access node further converts the access traffic data into a data format of a training set of the access traffic prediction model, adds the access traffic data into the training set and performs a real-time training to update the access traffic prediction model.

7. The system according to claim 1, wherein, the cloud platform further determines a traffic threshold for each access node corresponding to the next moment according to the prediction result of network traffic for each access node; and issues the traffic threshold for each access node corresponding to the next moment to the corresponding access node.

8. The system according to claim 7, wherein, the cloud platform calculates a traffic threshold for a port n at an access node p corresponding to the next moment according to a prediction result of traffic $r_{t+1}^{network,p,n}$ to be forwarded at the next moment for the port n of the node p through the following equation:

$$h_{t+1}^{p,n} = m_0 - \Sigma_i r_{t+1}^{network,p,i}, \; i \in I$$

wherein, $m_0$ is a physical maximum bearing traffic limit for the access node; I is a set of ports having path dependencies with the port n;
the cloud platform calculates the traffic threshold of the access node p corresponding to the next moment according to the traffic threshold for the port n of the access node p corresponding to the next moment through the following equation:

$$h_{t+1}^p = \Sigma_n h_{t+1}^{p,n}, \; n \in N$$

wherein, N is a set of all ports of the access node p.

9. The system according to claim 1, wherein the cloud platform further adds the network traffic data to a training set and performs a real-time training to update the network traffic prediction model.

10. The system according to claim 1, wherein the cloud platform further determines a size of local data required to be uploaded to the cloud platform at the next moment for each access node, and issue the size of the local data required to be uploaded to the cloud platform at the next moment for each access node to the corresponding access node;

the cloud platform determines the prediction result of traffic for each node according to the prediction result of the network traffic at the next moment for each access node, the prediction result of the access traffic at the next moment received from each access node and the size of the local data required to be uploaded to the cloud platform at the next moment for each access node.

11. A method of traffic prediction for IoT, comprising:
collecting, by each access node, traffic data;
clustering, by each access node, the traffic data into access traffic data and network traffic data according to path information in the traffic data;
inputting, by each access node, the access traffic data into an access traffic prediction model configured, to obtain a prediction result of the access traffic at a next moment output by the traffic prediction model;
uploading, by each access node, the prediction result of access traffic at the next moment and the network traffic to a cloud platform;
receiving, by the cloud platform, the network traffic data and the prediction result of access traffic at the next moment reported by each access node;
inputting, by the cloud platform, the network traffic data into a network traffic prediction model configured, to obtain a prediction result of the network traffic for each access node at the next moment output by the network traffic prediction model; and
determining and outputting, by the cloud platform, a prediction result of traffic at the next moment for each access node according to the prediction result of access traffic at the next moment for each access node and the prediction result of network traffic at the next moment.

12. The method according to claim 11, wherein the traffic data information comprises:
date, time, duration, size, path information of the traffic and an ID of a node collecting information, wherein the path information comprises an IP address and port information of a source node and an IP address and port information of a destination node of the traffic;
the method further comprises: storing, by the at least one access node, the collected traffic data in a database in a format of a tuple, after collecting the traffic data; and
clustering the traffic data into access traffic data and network traffic data according to path information in the traffic data comprises: determining whether the traffic data is the access traffic data or the network traffic data based on the source node IP and the destination node IP in the path information of the traffic data.

13. The method according to claim 11, further comprising:
comparing, by the at least one access node, the prediction result of the access traffic at the next moment with a traffic threshold for the access node corresponding to the current moment $h_t^p$; and
uploading the prediction result of access traffic at the next moment and the network traffic data to the cloud platform when the prediction result of access traffic at the next moment is smaller than $h_t^p$.

14. The method according to claim 11, further comprising:
backing up, by the at least one access node, the network traffic data locally when the prediction result of access traffic at the next moment is greater than or equal to $h_t^p$; and uploading the prediction result of access traffic at the next moment and a size of the network traffic data $s_t^P$ to the cloud platform.

15. The method according to claim 11, further comprising:
cleaning, by the access node, incomplete data records, repeated data records and records roaming to the local in the traffic data information collected before clustering the traffic data.

16. The method according to claim 11, further comprising:
converting, by the access node, the access traffic data into a data format of a training set of the access traffic prediction model;
adding, by the access node, the access traffic data into the training set; and
performing, by the access node, a real-time training to update the access traffic prediction model.

17. The method according to claim 11, further comprising:
determining, by the cloud platform, a traffic threshold for each access node corresponding to the next moment according to the prediction result of network traffic for each access node; and
issuing, by the cloud platform, the traffic threshold for each access node corresponding to the next moment to the corresponding access node.

18. The method according to claim 17, further comprising:
calculating, by the cloud platform, a traffic threshold for a port n at an access node p corresponding to the next moment according to a prediction result of traffic $r_{t+1}^{network,p,n}$ to be forwarded at the next moment for the port n of the node p through the following equation:

$$h_{t+1}^{p,n}=m_0-\Sigma_i r_{t+1}^{network,p,i}, i \in I$$

wherein, $m_0$ is a physical maximum bearing traffic limit for the access node; I is a set of ports having path dependencies with the port n;
calculating, by the cloud platform, the traffic threshold of the access node p corresponding to the next moment according to the traffic threshold for the port n of the access node p corresponding to the next moment through the following equation:

$$h_{t+1}^{p}=\Sigma_n h_{t+1}^{p,n}, n \in N$$

wherein, N is a set of all ports of the access node p.

19. The method according to claim 11, further comprising:
adding, by the cloud platform, the network traffic data to a training set; and
performing, by the cloud platform, a real-time training to update the network traffic prediction model.

20. The method according to claim 11, further comprising:
determining, by the cloud platform, a size of local data required to be uploaded to the cloud platform at the next moment for each access node;
issuing, by the cloud platform, the size of the local data required to be uploaded to the cloud platform at the next moment for each access node to the corresponding access node; wherein,
determining a prediction result of traffic at the next moment for each access node comprises: determining the prediction result of traffic for each node according to the prediction result of the network traffic at the next moment for each access node, the prediction result of the access traffic at the next moment received from each access node and the size of the local data required to be uploaded to the cloud platform at the next moment for each access node.

* * * * *